United States Patent
Udupa et al.

(10) Patent No.: US 10,043,250 B2
(45) Date of Patent: Aug. 7, 2018

(54) INTERACTIVE NON-UNIFORMITY CORRECTION AND INTENSITY STANDARDIZATION OF MR IMAGES

(71) Applicant: The Trustees Of The University Of Pennsylvania, Philadelphia, PA (US)

(72) Inventors: Jayaram K. Udupa, Philadelphia, PA (US); Dewey Odhner, Horsham, PA (US); Yubing Tong, Norwood, PA (US); Drew A. Torigian, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 100 days.

(21) Appl. No.: 15/080,871

(22) Filed: Mar. 25, 2016

(65) Prior Publication Data
US 2016/0284071 A1    Sep. 29, 2016

Related U.S. Application Data

(60) Provisional application No. 62/138,006, filed on Mar. 25, 2015.

(51) Int. Cl.
*G06K 9/00*      (2006.01)
*G06T 5/00*      (2006.01)
(Continued)

(52) U.S. Cl.
CPC .............. *G06T 5/009* (2013.01); *G06T 5/50* (2013.01); *G06T 7/0012* (2013.01);
(Continued)

(58) Field of Classification Search
CPC ......... G06T 5/009; G06T 5/50; G06T 7/0012; G06T 2207/30024; G06T 2207/20208;
(Continued)

(56) References Cited

U.S. PATENT DOCUMENTS

| 6,584,216 B1 * | 6/2003 | Nyul .............. G06T 5/009 250/474.1 |
| 2008/0292194 A1 * | 11/2008 | Schmidt .............. G06T 7/0012 382/217 |

(Continued)

OTHER PUBLICATIONS

Bai et al., "Multi-atlas segmentation with augmented features for cardiac MR images", Medical Image Analysis, Jan. 2015, 19(1), 98-109.

(Continued)

*Primary Examiner* — Yon Couso
(74) *Attorney, Agent, or Firm* — Baker & Hostetler LLP

(57) ABSTRACT

Interactive non-uniformity correction (NC) and interactive intensity standardization (IS) require sample tissue regions to be specified for several different types of tissues. Interactive NC estimates the degree of non-uniformity at each voxel in a given image, builds a global function for non-uniformity correction, and then corrects the image to improve quality. Interactive IS includes two steps: a calibration step and a transformation step. In the first step, tissue intensity signatures of each tissue from a few subjects are utilized to set up key landmarks in a standardized intensity space. In the second step, a piecewise linear intensity mapping function is built between the same tissue signatures derived from the given image and those in the standardized intensity space to transform the intensity of the given image into standardized intensity. Interactive IS for MR images combined with interactive NC can substantially improve numeric characterization of tissues.

12 Claims, 3 Drawing Sheets

(51) Int. Cl.
  *G06T 5/50* (2006.01)
  *G06T 7/00* (2017.01)
(52) U.S. Cl.
  CPC ............ *G06T 2207/10088* (2013.01); *G06T 2207/20208* (2013.01); *G06T 2207/30024* (2013.01); *G06T 2207/30168* (2013.01)
(58) Field of Classification Search
  CPC . G06T 2207/30168; G06T 2207/10088; A61B 5/055; G06K 2209/051; G06K 9/6209
  See application file for complete search history.

(56) References Cited

U.S. PATENT DOCUMENTS

| | | | | |
|---|---|---|---|---|
| 2009/0046915 | A1* | 2/2009 | Hou | G01R 33/56563 382/131 |
| 2015/0045651 | A1* | 2/2015 | Crainiceanu | A61B 5/055 600/410 |
| 2015/0071514 | A1* | 3/2015 | Wang | A61B 5/7221 382/131 |

OTHER PUBLICATIONS

Ge et al., "Numerical tissue characterization in MS via standardization of the MR image intensity scale", Journal of Magnetic Resonance Imaging, Nov. 2000, vol. 12, 715-721.

Madabhushi et al., "Interplay between intensity standardization and inhomogeneity correction in MR image processing", IEEE Transactions on Medical Imaging, May 2005, vol. 24, 561-576.

Nyúl et al., "New variants of a method of MRI scale standardization", IEEE Transactions on Medical Imaging, Feb. 2000, vol. 19, 143-150.

Nyúl et al., "On standardizing the MR image intensity scale", Magnetic Resonance in Medicine, 1999, 42(6), 1072-1081.

Sled et al., "A nonparametric method for automatic correction of intensity non-uniformity in MRI data", IEEE Transactions on Medical Imaging, Feb. 1998, vol. 17, 87-97.

Tustison et al., "N4ITK: improved N3 bias correction", IEEE Transaction on Medical Imaging, Jun. 2010, vol. 29, 6, 1310-1320.

Vovk et al., "A review of methods for correction of intensity inhomogeneity in MRI", IEEE Transactions on Medical Imaging, Mar. 2007, vol. 26, 3, 405-421.

Wu et al., "Intensity standardization in breast MR images improves tissue quantification", Medical Imaging: Proceedings of SPIE, 2013, vol. 8668, 866822-1-866822-6.

Zhuge et al., "Image background inhomogeneity correction in MRI via intensity standardization", Computerized Medical Imaging and Graphics, Jan. 2009, 33(1), 7-16.

Zhuge et al., "Membership-based multiprotocol MR brain image segmentation", Medical Imaging: Proceedings of SPIE, 2003, vol. 5032, 1572-1579.

\* cited by examiner

INTERACTIVE NON-UNIFORMITY CORRECTION AND INTENSITY STANDARDIZATION OF MR IMAGES

CROSS-REFERENCE TO RELATED APPLICATION

The present application claims priority to U.S. Provisional Patent Application No. 62/138,006, filed Mar. 25, 2015. The content of that patent application is hereby incorporated in its entirety.

GOVERNMENT RIGHTS

This invention was made with government support under Grant No. HL 105212 awarded by the Department of Health and Humans Services. The government has certain rights in the invention.

TECHNICAL FIELD

The invention relates to a method for interactive non-uniformity correction and intensity standardization of magnetic resonance (MR) images using sample tissue regions specified for several different types of tissues.

BACKGROUND

Image non-uniformity and intensity non-standardness are two major hurdles encountered in human and computer interpretation and analysis of magnetic resonance (MR) images. The former phenomenon is caused by imperfections in the imaging device, specifically the magnetic field, and has been studied extensively, where many solutions have been proposed in the literature. See, for example, Sled JG, et al. "A nonparametric method for automatic correction of intensity non-uniformity in MRI data," IEEE Trans. Medical Imaging, vol. 17, 87-97 (1998); Tustison, N. J., Avants, B. B., Cook, P. A., Zheng, Y., Egan, A., Yushkevich, P. A., Gee, J. C., "N4ITK: improved N3 bias correction," IEEE Transaction on Medical Imaging, 29 (6), 1310-1320 (2010); and Vovk U, Pernus F, Likar B., "A review of methods for correction of intensity inhomogeneity in MRI," IEEE Trans Med Imaging, 26(3), 405-421 (2007). Generally, the intensity non-uniformity component is assumed to be multiplicative or additive, i.e., the component is multiplicative or additive to an ideal image. Most frequently, the multiplicative model has been used as it is consistent with the inhomogeneous sensitivity of the receiver coil of the magnetic resonance imaging (MRI) scanner. The N3 and N4 algorithms described by Sled et al. and Tustison et al. are two popular correction approaches which have adopted the multiplicative model.

Although to a far lesser extent, solutions have also been presented for the second problem of intensity non-standardness. See, for example, Nyúl LG, Udupa J. K., "On standardizing the MR image intensity scale," Magn. Reson. Med., 42 (6), 1072-1081 (1999); and Nyúl LG, Udupa J. K., "New variants of a method of MRI scale standardization," IEEE, Trans. Medical Imaging, vol. 19, 143-150 (2000). This phenomenon causes the lack of a tissue specific numeric intensity meaning, even within the same MRI protocol, for the same body region, for images obtained on the same scanner, and for the same patient. It is also known that all non-uniformity correction methods introduce their own non-standardness as part of the correction process itself (see Madabhushi A, Udupa J. K., "Interplay between intensity standardization and inhomogeneity correction in MR image processing," IEEE Trans. Medical Imaging, vol. 24, 561-576 (2005)). The interplay between the two processes, proper ways of handling the phenomena in combination, and the manner in which image segmentation performance improves substantially when these problems are addressed properly have also been demonstrated (see, for example, Bai W., Shi W., Ledig C., Rueckert D., "multi-atlas segmentation with augmented features for cardiac MR," Medical Image Analysis, 19(1), 98-109 (2015); Wu. S., Udupa J. K., Marinaki A., Weinstein S. P., Kontos D., "Intensity standardization in breast MR images improves tissue quantification," Medical Imaging: Proc. SPIE, vol. 8668, 866822-1-866822-6 (2013); Ge Y, Udupa J. K., et al. "Numerical tissue characterization in MS via standardization of the MR image intensity scale," Journal of Magn. Reson. Imag, vol. 12, 711-721 (2000); Zhuge Y, Udupa J. K., "Membership-based multiprotocol MR brain image segmentation," Medical Imaging: Proc. SPIE, vol. 5032, 1572-1579 (2003); and Zhuge, Y., Udupa J. K., et al., "Image background inhomogeneity correction in MRI via intensity standardization," Comp. Med. Imag. and Graph., 33(1),7-16 (2009)).

However, in many practical situations, automated methods fail to yield acceptable solutions for both problems. This is mainly because solutions for both problems require identifying regions representing the same tissue type for several different tissues, and the automatic strategies, irrespective of the approach, may fail in this task. It remains desirable to provide interactive strategies to overcome this problem in both phenomena wherein the required high level knowledge is provided by an operator to improve image quality substantially in such situations.

SUMMARY

Interactive non-uniformity correction and intensity standardization approaches are described that address the above and other needs in the art by providing improvements in the image based on MR images of the abdomen in an exemplary embodiment. These approaches will be referred to herein as iNC and iIS, respectively, for interactive non-uniformity correction and interactive intensity standardization.

The methods presented herein provide interactive strategies to overcome the problems noted above by requiring sample tissue regions to be specified for several different types of tissues. Interactive NC estimates the degree of non-uniformity at each voxel in a given image, builds a global function for non-uniformity correction, and then corrects the image to improve quality. Interactive IS includes two steps: a calibration step and a transformation step. In the calibration step, tissue intensity signatures of each tissue from a few subjects are utilized to set up key landmarks in a standardized intensity space. In the transformation step, a piecewise linear intensity mapping function is built between the same tissue signatures derived from the given image and those in the standardized intensity space to transform the intensity of the given image into standardized intensity. Preliminary results on abdominal T1-weighted and T2-weighted MR images of 20 subjects show that interactive NC and IS are feasible and can significantly improve image quality over automatic methods. Interactive IS for MR images combined with interactive NC can substantially improve numeric characterization of tissues.

In exemplary embodiments, the invention includes a system and method for providing interactive non-uniformity correction (NC) and interactive intensity standardization (IS). In an exemplary embodiment, the method includes the steps of:

specifying sample tissue regions for several different types of tissues;

estimating a degree of non-uniformity at each voxel in a sample image of the sample tissue regions;

building a global function for non-uniformity correction of the sample image;

correcting the sample image to improve image quality;

using tissue intensity signatures of each sample tissue from a few subjects to set up key landmarks in a standardized intensity space of the corrected sample image; and building a piecewise linear intensity mapping function between the same tissue signatures derived from the corrected sample image and those in the standardized intensity space to transform the intensity of the corrected sample image into a standardized intensity.

In exemplary embodiments, the specifying step comprises selecting sample tissue that is normal or near normal, selecting a sample tissue region that is spatially well-distributed throughout the image volume, and selecting a sample tissue region that can be reliably sampled by an interactive operation. The specifying step further comprising the step of creating a binary mask file for each tissue type in the sample image by drawing tissue regions having only one tissue type.

In the exemplary embodiments, the estimating step comprises the steps of, for each image in a given set of images and a tissue region in each the image, estimating the degree of non-uniformity at each voxel in the tissue region by comparing a value of the voxel to a mean intensity of the tissue region to estimate either an additive of a multiplicative factor, and fitting a second degree polynomial to the estimated non-uniformity factors in the tissue region. The step of building a global function comprises combining functions fitted to the second degree polynomial from all tissue regions in each image.

In the exemplary embodiments, determining the tissue intensity signatures of each sample tissue includes finding mean intensities corresponding to each tissue region and performing a piecewise linear transformation or curve fitting to the mean intensities.

The scope of the invention also includes a system including a processor that executes stored instructions for executing the steps of the method. The above and other characteristic features of the invention will be apparent from the following detailed description of the invention.

BRIEF DESCRIPTION OF THE DRAWINGS

The present application is further understood when read in conjunction with the appended drawings. In the drawings.

DETAILED DESCRIPTION OF ILLUSTRATIVE EMBODIMENTS

Figure 1:
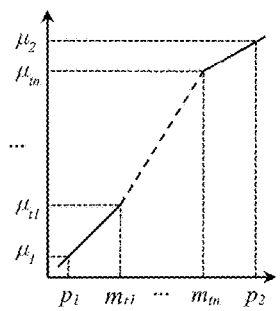
FIG. 1 illustrates the iIS operation where the abscissa represents the mean intensities of the reference tissues in a test image and the ordinate denotes the standardized reference intensities.

Certain specific details are set forth in the following description with respect to FIGS. 1-2 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Materials and Methods

Image Data: Abdominal MR images of acceptable quality from 20 subjects (between 26-85 years) with normal appearing livers as per a board-certified radiologist's (DAT) review were utilized for illustrating the new iNC and iIS approaches. All MR images had been previously acquired on 1.5T MRI scanners. In-phase T1-weighted gradient recalled echo (TR=150 msec, TE=4 msec) and non-fat suppressed heavily T2-weighted fast spin echo (TR~490 msec, TE=90 msec) images were utilized for this study. Scene size is 512×432×20-30 and voxel size is 0.78×0.78×8.00 mm³.

Notations: NC—non-uniformity correction; IS—intensity standardization; aNC—automated NC by the method described by Zhuge et al.; N3—NC method of Sled et al.; aIS—automated IS by the method described by Nyul et al.; iNC, iIS—interactive NC and interactive IS, respectively, by the new approach presented herein; D—a given set of images; $D_c$—the set of images resulting from applying a NC method c to the images in D; and $D_{c,s}$—the set of images resulting from applying an IS method s to the images in $D_c$. If an IS method s is applied directly on the original images in D, the resulting set will be denoted by D. In the inventor's study, c∈{aNC, N3, iNC} and s∈{aIS, iIS}. t1, . . . ,tn–n different types of tissues. $D^{t1}$, . . . , $D^{tn}$—the sets of binary images corresponding to the images in D where the binary images represent masks indicating sample tissue regions for t1, . . . , tn, respectively.

The basic idea behind both iNC and iIS approaches is to first decide on the different tissue types that can be used as reference and to subsequently delineate sample regions for these tissues in the images in D. The selection of tissue type should be guided by three criteria: (i) the tissue is normal or near normal, (ii) the tissue region is spatially well-distributed throughout the image volume, and (iii) the tissue region can be reliably sampled by an efficient interactive operation such as painting with broad brush strokes. The sampled tissue regions are subsequently utilized for performing both iNC and iIS operations.

For each image in the given set D of images, a binary mask file for each of n tissue types t1, . . . , tn is created by drawing tissue regions guided by the above criteria. The mask does not need to be the exact delineation of the whole boundary of the tissue region, but the marked regions should be pure in the sense of containing only one tissue type. Any combination of quick interactive segmentation tools can be used for this purpose such as painting by broad brush strokes. The inventors perform this and all other operations described herein by using the open source software system CAVASS (see Grevera G., Udupa J. K., et al., "CAVASS: A computer-assisted visualization and analysis software system," Journal of Digital Imaging, vol. 20, 101-118 (2007)). The inventors employ the same set of mask data sets $D^{t1}, \ldots, D^{tm}$ for both iNC and iIS processes as described below. In other words, user interaction is needed only once and not separately for each process.

Interactive Non-uniformity Correction—iNC

For iNC, the inventors are given the original image set D and the associated binary image sets $D^{t1}, \ldots, D^{tm}$. For each image I in D and the tissue region $R_i$ corresponding to ti in I, the inventors estimate the degree of non-uniformity at each voxel in $R_i$ as traditionally done by comparing the voxel value to the mean intensity in $R_i$ for estimating either an additive or a multiplicative factor. The inventors fit a second degree polynomial to the estimated non-uniformity factors in $R_i$. In this process, the inventors treat each tissue region as an independent entity. Subsequently, the inventors combine the fitted functions from all tissue regions into a global function. The image I is then corrected using the combined global function. For the input set D, the output image set produced by the iNC operation will be $D_{iNC}$.

Interactive Intensity Standardization—iIS

The iIS operation consists of two steps—a one-time calibration step and a transformation step that is performed for each image to be standardized. To reap the full benefits of standardization, as recommended by Madabhushi, the inventors perform iIS after iNC. Otherwise, if iIS is performed first followed by iNC, as demonstrated by Madabhushi, residual non-standardness introduced by the (any) NC method will be left over. That is, the inventors perform iIS on the set $D_{iNC}$ resulting from applying iNC on D. Note that iIS can also be applied directly on D, or $D_c$ for any c∈{aNC, N3, iNC}, or even $D_{aIS}$. Below $D_c$ will be used to denote any input image set for the iIS operation.

The purpose of the calibration step is to estimate parameters of the standard intensity scale, as shown in FIG. 1. Some sample images from the input set $D_c$ are used for this purpose. The parameters of the standard scale are the "signatures" $\mu_{t1}, \ldots, \mu_{tm}$ of the different reference tissues. In this application, the inventors take $\mu_{t1}, \ldots, \mu_{tm}$ to be the mean of the intensities in the n tissue regions $R_i$ within the sample images of $D_c$. Instead, other tissue-specific signatures may also be employed. Additionally two other parameters are used—$p_1$ which denotes the lowest meaningful intensity, and $p_2$ that indicates the largest meaningful intensity. As in Nyul et al., the inventors take $p_1$ to be the smallest intensity over all sample images and $p_2$ to be the intensity at the 99.8 percentile within the sample images. By observing thousands of MR images under different protocols and body regions, it has been found by Nyul et al. that there is usually a distinct cut off at 99.8 percentile beyond which the intensities represent mostly outlier values.

In the transformation step, given any image $I \in D_c$, it is standardized by first finding its tissue signatures, in this case the mean intensities $m_{t1}, \ldots, m_{tm}$ corresponding to its n tissue regions, and then performing a piecewise linear transformation, as illustrated in FIG. 1. Instead of the piecewise linear mapping, any curve fitting method may also be used. The set of images that result will be, as per the above notation, $D_{c,iIS}$. Note that the transformation extends beyond $(p_2, \mu_2)$ along the positive axes directions and beyond $(p_1, \mu_1)$ along the negative axes directions following the corresponding linear segments. In this manner, no input intensities are lost and a 1:1 mapping can be guaranteed.

To sum up, user interaction is needed only once for each image for performing both iNC and iIS operations. As pointed out earlier, many combinations of the NC and IS operations and their iterative executions are possible, although they are not explored herein.

Results

The inventors use the data set D described in the previous section for testing the iNC and iIS approaches. For the calibration step of iIS, the inventors used 5 images from the set $D_{iNC}$. For comparison, the inventors also applied the automatic methods aNC and aIS in that order to D to yield the non-uniformity corrected set $D_{aNC}$ and corrected and standardized image set $D_{aNC, aIS}$. The inventors used two tissue types (n=2), fat and muscle, as reference for the correction and standardization operations.

Note that many different combinations of operations can be carried out and compared for the quality of the final images. Following the above notation, the combinations which are compared in this initial study are as follows. For NC: D, $D_{N3}$, $D_{aNC}$, and $D_{iNC}$. For IS: D, $D_{aNC,aIS}$, and $D_{iNC,iIS}$.

To assess the performance of an NC operation c∈{aNC, N3, iNC}, the inventors estimate the percent coefficient of variation (% cv) of intensity within each specific tissue region in each image I in the resulting image set $D_c$ and then describe the mean and standard deviation of this % cv value over all images in this set. Percent cv values within a tissue region in an image I in $D_c$ give an indication of the amount of residual non-uniformity left over in I as attested by the tissue region. For this evaluation, in addition to the fat and muscle tissue regions used as reference, the inventors use the liver object region as an independent additional test tissue region. To facilitate this analysis, the inventors segmented the liver 3D region in all images by using the user-driven live wire method. The image sets have been selected carefully to make sure that the liver region is normal in every image.

For assessing the performance of an IS operation s in conjunction with an NC operation c in the resulting image set $D_{c,s}$, the mean intensity is estimated in each tissue region in each image I in $D_{c,s}$, and the mean and standard deviation of this mean intensity are described over all images in the set. This is a sensible approach since non-standardness is a trait of not a given image but of how the same tissue property changes over a subject population. The inventors use the same three tissue regions for IS evaluation as for NC.

Table 1 lists the mean and standard deviation of the % cv values for NC operations on T1-weighted in-phase images for the sets D, $D_{N3}$, $D_{aNC}$, and $D_{iNC}$. The p-values resulting from separate t-tests comparing $D_{N3}$, $D_{aNC}$, and $D_{iNC}$ with D are also listed in the table. Similarly, Table 2 lists % cv and p-values for the T2-weighted images. Tables 3 and 4 analogously display the mean and standard deviation of mean tissue intensities for T1- and T2-weighted images illustrating the performance of the IS operations.

TABLE 1

Results for non-uniformity correction. Mean and standard deviation of % cv values for T1-weighted in-phase MR images.

|  | Liver | p-value | Fat | p-value | Muscle | p-value |
|---|---|---|---|---|---|---|
| D | 17.66 (3.05) | — | 16.82 (4.48) | — | 17.27 (15.66) | — |
| $D_{N3}$ | 18.45 (2.86) | 0.15 | 11.53 (5.59) | 0.0 | 12.64 (4.89) | 0.08 |
| $D_{aNC}$ | 17.50 (7.31) | 0.46 | 19.85 (9.70) | 0.06 | 15.16 (6.26) | 0.25 |
| $D_{iNC}$ | 17.35 (5.26) | 0.36 | 14.01 (5.87) | 0.01 | 11.76 (3.40) | 0.03 |

TABLE 2

Results for non-uniformity correction. Mean and standard
deviation of % cv values for T2-weighted MR images.

|         | Liver        | p-value | Fat          | p-value | Muscle       | p-value |
|---------|--------------|---------|--------------|---------|--------------|---------|
| D       | 33.05 (9.47) | —       | 18.40 (4.97) | —       | 36.25 (7.58) | —       |
| $D_{N3}$  | 33.44 (8.22) | 0.35    | 9.65 (3.32)  | 0.0     | 36.79 (7.33) | 0.2     |
| $D_{aNC}$ | 33.64 (9.42) | 0.46    | 17.17 (6.99) | 0.06    | 45.48 (18.94)| 0.25    |
| $D_{iNC}$ | 30.83 (9.04) | 0.36    | 13.38 (3.24) | 0.01    | 34.89 (6.95) | 0.04    |

TABLE 3

Intensity standardization. Mean and standard deviation of
tissue mean intensities for T1-weighted in-phase MR images.

|                | D |  |  | $D_{aNC, aIS}$ |  |  | $D_{iNC, iIS}$ |  |  |
|----------------|--------|--------|--------|--------|---------|---------|---------|---------|---------|
|                | Liver  | Fat    | Muscle | Liver  | Fat     | Muscle  | Liver   | Fat     | Muscle  |
| Mean intensity | 325.21 | 575.42 | 273.55 | 1460.8 | 2534.64 | 1248.32 | 1713.33 | 2567.20 | 1278.11 |
| SD             | 191.24 | 282.72 | 133.92 | 161.47 | 264.65  | 294.91  | 183.11  | 87.02   | 24.38   |
| cv %           | 58.81  | 49.13  | 48.96  | 11.06  | 10.44   | 23.62   | 10.69   | 3.39    | 1.91    |

TABLE 4

Intensity standardization. Mean and standard deviation
of tissue mean intensities for T2-weighted MR images.

|                | D |  |  | $D_{aNC, aIS}$ |  |  | $D_{iNC, iIS}$ |  |  |
|----------------|--------|--------|--------|--------|---------|--------|--------|---------|--------|
|                | Liver  | Fat    | Muscle | Liver  | Fat     | Muscle | Liver  | Fat     | Muscle |
| Mean intensity | 128.40 | 678.08 | 117.51 | 531.33 | 2475.21 | 373.10 | 647.86 | 2483.35 | 497.19 |
| SD             | 56.32  | 290.89 | 69.79  | 161.50 | 193.04  | 169.78 | 166.61 | 38.77   | 20.96  |
| cv %           | 43.87  | 42.90  | 59.39  | 30.40  | 7.80    | 45.51  | 25.72  | 1.56    | 4.22   |

Figure 2:
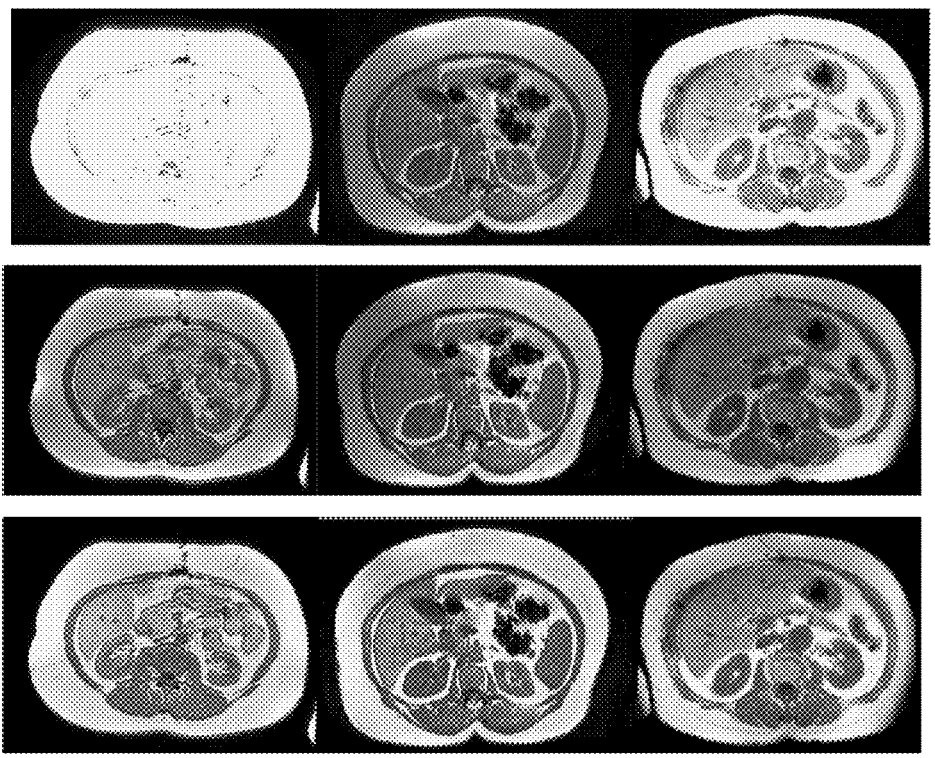
FIG. 2 illustrates a display of a sample slice from the images of three subjects. Top row: D. Middle row: $D_{aNC, aIS}$. Bottom row: $D_{iNC, iIS}$.
Figure 3:
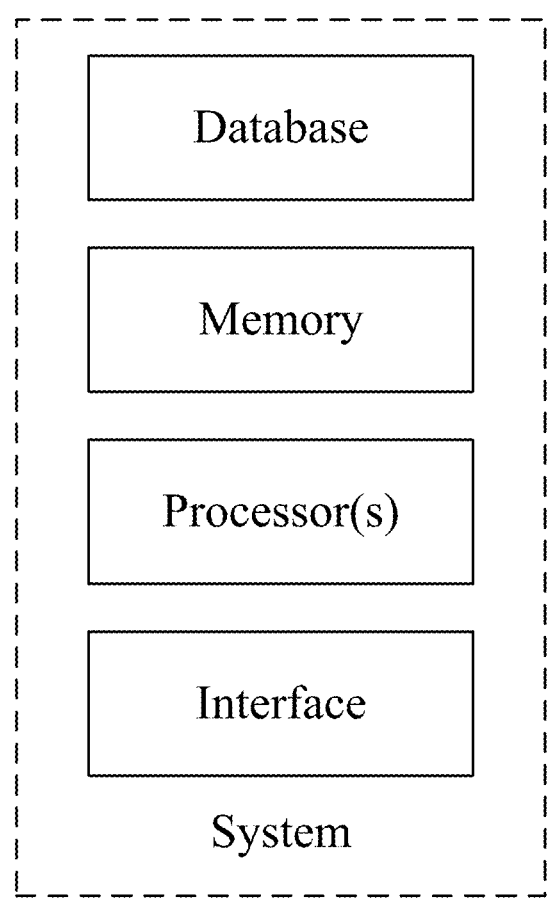
FIG. 3 illustrates an example of a system in accordance with aspects of the present disclosure.
Figure 4:
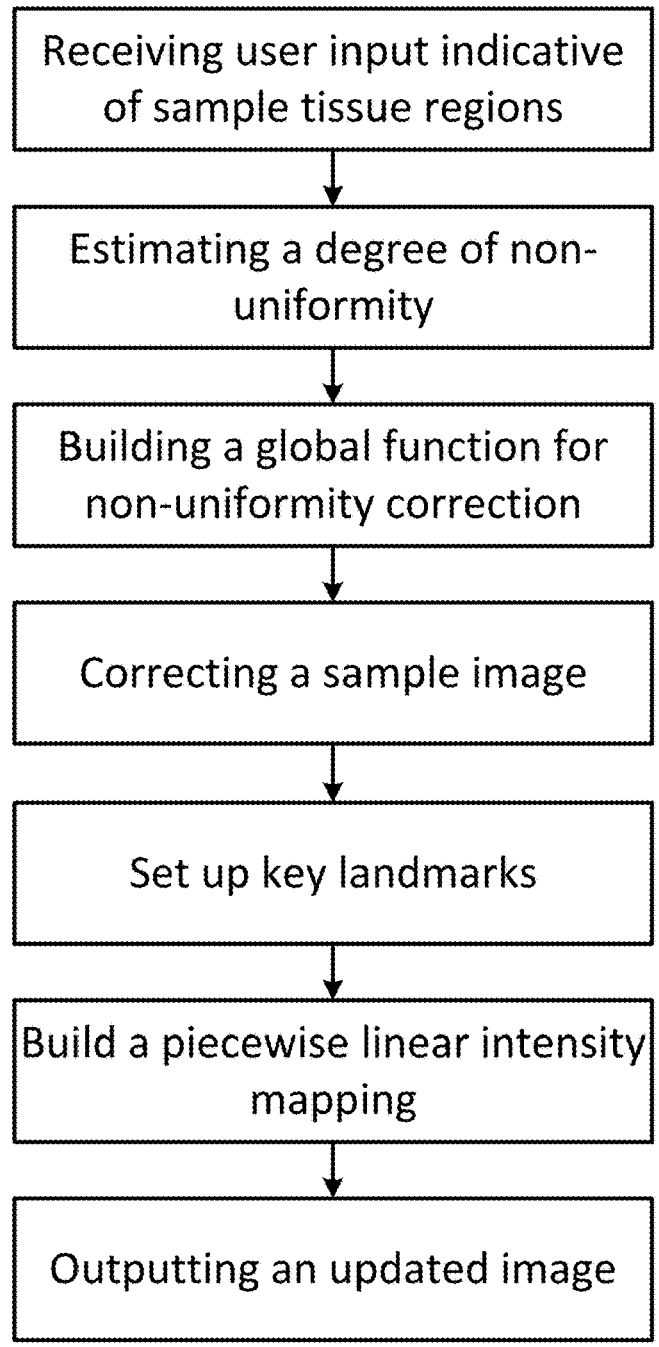
FIG. 4 illustrates an example of a method in accordance with aspects of the present disclosure.

FIG. 2 displays one slice of the T1-weighted images from each of three subjects from the sets D, $D_{aNC, aIS}$, and $D_{iNC, iIS}$. The images from D shown in the first row are difficult to display at a fixed window gray level setting because of the intensity non-standardness present among subjects. The second row displays images from the set $D_{aNC, aIS}$ where automatic NC and IS have been applied. The images clearly demonstrate an improvement when displayed at a fixed gray level window setting. The last row shows corresponding images for the same three subjects drawn from $D_{iNC, iIS}$ resulting from interactive NC and IS. The fixed gray level window display seems to show the best portrayal of each type of tissue in the three subjects at about the same brightness level, clearly indicating the improved numeric characterization achieved for the tissues across subjects.

From Tables 1 and 2, the inventors observe that iNC generally performs better than the other two automatic NC methods. More importantly, the quality of the images obtained after iNC and iIS operations is substantially better than the quality of the images after the automated operations aNC and aIS for all tissue regions.

CONCLUSIONS

The inventors have presented an interactive strategy for correcting image intensity non-uniformities and non-standardness. The interaction required for both operations is only once in the form of regions of two or more tissue regions painted in each given image. Non-standardness correction has an initial one-time calibration step. The inventors presented an evaluation of the two methods comparing them to some automated methods from the literature on T1- and T2-weighted abdominal MR images. The overall quality improvement achieved by the two operations applied in tandem seems to be substantial in terms of the tissue specificity achieved by the numeric pixel values.

More extensive evaluations of other combinations of the NC and IS operations on other types of images from different body regions are underway. One disadvantage of the methods is the human interaction required on a per image basis. The inventors are investigating ways of reducing this interaction to a minimum where one can still achieve substantial quality advantage for the resulting images. The inventors are also studying severe cases of non-uniformity that can be handled satisfactorily by the proposed methods where other automatic methods may fail.

It will be appreciated that the methods described herein may be implemented in software that operates on a processor that executes instructions stored in a memory component. The processor may include a standardized processor, a specialized processor, a microprocessor, or the like. The processor may execute instructions including, for example, instructions for implementing the method as described herein. On the other hand, the memory component stores the instructions that may be executed by the processor. The memory component may include a tangible computer readable storage medium in the form of volatile and/or nonvolatile memory such as random access memory (RAM), read only memory (ROM), cache, flash memory, a hard disk, or any other suitable storage component. In one embodiment, the memory component may be a separate component in communication with a processor, while in another embodiment, the memory component may be integrated into the processor. Such non-transitory memory components may be used as a computer readable storage device to store the instructions for implementing the methods and software features described herein.

Those skilled in the art also will readily appreciate that many additional modifications are possible in the exemplary embodiment without materially departing from the novel teachings and advantages of the invention. Accordingly, any such modifications are intended to be included within the scope of this invention as defined by the following exemplary claims.

What is claimed:

1. A computerized method for interactive non-uniformity correction (NC) and interactive intensity standardization (IS), comprising the steps of:
   receiving, via a user interface associated with a computing system, a user input indicative of sample tissue regions for several different types of tissues;
   estimating, by the computing system, a degree of non-uniformity at each voxel in a sample image of the sample tissue regions;
   building a global function for non-uniformity correction of the sample image;
   correcting the sample image to improve image quality;
   using tissue intensity signatures of each sample tissue from a plurality of subjects to set up key landmarks in a standardized intensity space of the corrected sample image; building a piecewise linear intensity mapping function between the same tissue signatures derived from the corrected sample image and those in the standardized intensity space to transform the intensity of the corrected sample image into a standardized intensity; and
   outputting, based on at least the piecewise linear intensity mapping function and the sample image, an updated image, wherein the updated image is outputted via the user interface or a second user interface associated with the computing system.

2. The method of claim 1, wherein the user input is indicative of a user-selected sample tissue that is normal or near normal, a user-selected sample tissue region that is spatially well-distributed throughout the image volume, and/or a user-selected sample tissue region that can be reliably sampled by an interactive operation.

3. The method of claim 2, further comprising the step of creating a binary mask file for each tissue type in the sample image by drawing tissue regions having only one tissue type.

4. The method of claim 1, wherein the estimating step comprises the steps of, for each image in a given set of images and a tissue region in each said image, estimating the degree of non-uniformity at each voxel in the tissue region by comparing a value of the voxel to a mean intensity of the tissue region to estimate either an additive of a multiplicative factor, and fitting a second degree polynomial to the estimated non-uniformity factors in the tissue region.

5. The method of claim 4, wherein building a global function comprises combining functions fitted to the second degree polynomial from all tissue regions in each said image into the global function.

6. The method of claim 5, further comprising determining the tissue intensity signatures of each sample tissue by finding mean intensities corresponding to each tissue region and performing a piecewise linear transformation or curve fitting to the mean intensities.

7. A system that performs interactive non-uniformity correction (NC) and interactive intensity standardization (IS) on a given image, comprising:
   a database that stores a sample image;
   a user interface configured to output at least the sample image;
   a memory storing computer instructions; and
   a processor that processes said computer instructions to cause the system to:
   specify sample tissue regions for several different types of tissues in the sample image;
   estimate a degree of non-uniformity at each voxel in the sample image of the sample tissue regions;
   build a global function for non-uniformity correction of the sample image;
   correct the sample image to improve image quality;
   use tissue intensity signatures of each sample tissue from a plurality of subjects to set up key landmarks in a standardized intensity space of the corrected sample image; build a piecewise linear intensity mapping function between the same tissue signatures derived from the corrected sample image and those in the standardized intensity space to transform the intensity of the corrected sample image into a standardized intensity; and
   output based on at least the piecewise linear intensity mapping function and the sample image, an updated image, wherein the updated image is outputted via the user interface or a second user interface associated with the system.

8. The system of claim 7, wherein the processor specifies sample tissue regions by enabling a user to select sample tissue that is normal or near normal, select a sample tissue region that is spatially well-distributed throughout the image volume, and select a sample tissue region that can be reliably sampled by an interactive operation.

9. The system of claim 8, wherein the processor creates a binary mask file for each tissue type in the sample image by drawing tissue regions having only one tissue type.

10. The system of claim 7, wherein the processor estimates, for each image in a given set of images and a tissue region in each said image, the degree of non-uniformity at each voxel in the tissue region by comparing a value of the voxel to a mean intensity of the tissue region to estimate either an additive of a multiplicative factor, and fits a second degree polynomial to the estimated non-uniformity factors in the tissue region.

11. The system of claim 10, wherein the processor builds the global function by combining functions fitted to the second degree polynomial from all tissue regions in each said image.

12. The system of claim 11, wherein the system is further configured to determine the tissue intensity signatures of each sample tissue by finding mean intensities corresponding to each tissue region and performing a piecewise linear transformation or curve fitting to the mean intensities.

* * * * *